US009836240B2

United States Patent
Tsirkin et al.

(10) Patent No.: US 9,836,240 B2
(45) Date of Patent: Dec. 5, 2017

(54) PROTECTION FOR MEMORY DEDUPLICATION BY COPY-ON-WRITE

(71) Applicant: Red Hat Israel, Ltd., Ra'anana (IL)

(72) Inventors: Michael Tsirkin, Ra'anana (IL);
Andrea Arcangeli, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 57 days.

(21) Appl. No.: 14/869,594

(22) Filed: Sep. 29, 2015

(65) Prior Publication Data
US 2017/0090816 A1 Mar. 30, 2017

(51) Int. Cl.
*G06F 12/12* (2016.01)
*G06F 3/06* (2006.01)

(52) U.S. Cl.
CPC .......... *G06F 3/0641* (2013.01); *G06F 3/0604* (2013.01); *G06F 3/0631* (2013.01); *G06F 3/0664* (2013.01); *G06F 3/0673* (2013.01)

(58) Field of Classification Search
CPC ............................ G06F 3/0641; G06F 3/0673
USPC ......................................................... 711/159
See application file for complete search history.

(56) References Cited

U.S. PATENT DOCUMENTS

| | | | |
|---|---|---|---|
| 6,789,156 B1 | 9/2004 | Waldspurger | |
| 7,472,252 B2 | 12/2008 | Ben-Zvi | |
| 8,074,047 B2 | 12/2011 | Abali et al. | |
| 8,190,827 B2 | 5/2012 | Eidus et al. | |
| 8,234,655 B2 | 7/2012 | Corry et al. | |
| 8,909,845 B1 | 12/2014 | Sobel et al. | |
| 9,053,053 B2 | 6/2015 | Bacher et al. | |
| 2009/0204650 A1* | 8/2009 | Wong | G06F 17/30153 |
| 2013/0159596 A1 | 6/2013 | Van et al. | |
| 2014/0281117 A1 | 9/2014 | Hepkin et al. | |
| 2015/0178198 A1* | 6/2015 | Pratt | G06F 12/08 711/6 |

OTHER PUBLICATIONS

Kuniyasu Suzaki, Kengo Iijima, Toshiki Yagi, and Cyrille Artho; "Memory Deduplication as a Threat to the Guest OS," 6 pages; National Institute of Advanced Industrial Science and Technology; Retrieved from https://staff.aist.go.jp/c.artho/papers/EuroSec2011-suzaki.pdf on Sep. 30, 2015.

(Continued)

*Primary Examiner* — Jae Yu
(74) *Attorney, Agent, or Firm* — Haynes and Boone, LLP (57) ABSTRACT

An example method of providing deduplication support for one or more memory pages includes setting, by a memory manager, an initial memory page to a write protection mode. The initial memory page is located in an address space allocated to a memory consumer. The method also includes detecting, by the memory manager, an attempted write to the initial memory page. The method further includes creating, by the memory manager, a copy of the initial memory page in response to detecting the attempted write. The method also includes discarding, based on a determination of whether to discard the initial memory page or the copy of the initial memory page, the initial memory page or the copy of the initial memory page to provide protection for memory deduplication.

20 Claims, 4 Drawing Sheets

(56) References Cited

OTHER PUBLICATIONS

Licheng Chen, Zhipeng Wei, Zehan Cui, Mingyu Chen, Haiyang Pan, and Yungang Bao; "CMD: Classification-Based Memory Deduplication Through Page Access Characteristics," Mar. 1-2, 2014; 12 pages; State Key Laboratory of Computer Architecture Institute of Computing Technology, Chinese Academy of Sciences; University of Chinese Academy of Sciences. Retrieved from http://asg.ict.ac.cn/hmtt/downloads/VEE2014_CMD.pdf on Sep. 30, 2015.

Konrad Miller, Fabian Franz, Thorsten Groeninger, Marc Rittinghaus, Marius Hillenbrand, and Frank Bellosa, KSM++: Using I/O Based Hints to Make Memory-Deduplication Scanners More Efficient; Mar. 3, 2012, pp. 8; Karlsruhe Institute of Technology (KIT). Retrieved from http://os.itec.kit.edu/downloads/publ_2012_miller-ua_ksm.pdf on Sep. 30, 2015.

Prateek Sharma and Purushottam Kulkarni; Singleton: System-wide Page Deduplication in Virtual Environments, Jun. 18-22, 2012; 12 pages; Department of Computer Science & Engineering Indian Institute of Technology Bombay http://www.cse.iitb.ac.in/~puru/research/pubs/paper/hpdc202-sharma.pdf.

* cited by examiner

PROTECTION FOR MEMORY DEDUPLICATION BY COPY-ON-WRITE

FIELD OF DISCLOSURE

The present disclosure generally relates to memory management, and more particularly to providing protection for memory deduplication.

BACKGROUND

Memory deduplication improves memory utilization by detecting that two (or more) pages in memory are identical and merging the duplicate pair of pages into a single page. In an example, a first memory page may reside in a first application's memory space, and a second memory page may reside in a second application's memory space. If the first and second memory pages have the same content, the first memory page may be considered a duplicate of the second memory page and removed. In such an example, the page table of the first application may be modified to point to the second memory page, and the first application may use the second memory page rather than the first memory page, thus improving the utilization of memory.

BRIEF SUMMARY

Methods, systems, and techniques are provided for providing deduplication support for one or more memory pages.

According to an embodiment, a method of providing deduplication support for one or more memory pages includes setting, by a memory manager, an initial memory page to a write protection mode. The initial memory page is located in an address space allocated to a memory consumer. The method also includes detecting, by the memory manager, an attempted write to the initial memory page. The method further includes creating, by the memory manager, a copy of the initial memory page in response to detecting the attempted write. The method also includes determining whether to discard the initial memory page or the copy of the initial memory page. The method further includes discarding, based on the determination of whether to discard the initial memory page or the copy of the initial memory page, the initial memory page or the copy of the initial memory page to provide protection for memory deduplication.

According to another embodiment, a system for providing deduplication support for one or more memory pages includes a memory that stores a plurality of memory pages. A first one of the plurality of memory pages is located in an address space allocated to a memory consumer. The system also includes a write protection state indicator associated with the first one of the plurality of memory pages. The system further includes a copy-on-write module that sets the write protection state indicator to a write protection mode, detects a write command associated with the first one of the plurality of memory pages, and creates a copy of the first one of the plurality of memory pages. The system also includes a protection module that discards the first one of the plurality of memory pages or the copy of the first one of the plurality of memory pages to provide protection for memory deduplication.

According to another embodiment, a machine-readable medium includes a plurality of machine-readable instructions that when executed by one or more processors are adapted to cause the one or more processors to perform a method including: setting, by a memory manager, an initial memory page to a write protection mode, where the initial memory page is located in an address space allocated to a memory consumer; detecting, by the memory manager, an attempted write to the initial memory page; creating, by the memory manager, a copy of the initial memory page in response to detecting the attempted write; determining whether to discard the initial memory page or the copy of the initial memory page; and discarding, based on the determination of whether to discard the initial memory page or the copy of the initial memory page, the initial memory page or the copy of the initial memory page to provide protection for memory deduplication.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview
II. Example System Architecture
A. Application as Memory Consumer
B. Virtual Machine as Memory Consumer
III. Example Process Flow
A. Copy-on-Write for the Memory Page
B. Discard One of the Identical Memory Pages
IV. Example Method
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A memory manager executing on a machine may process memory pages, insert them into a data structure, and identify memory pages in the data structure that are identical. Two memory pages are identical if the content stored at those pages is the same. If two memory pages are identified as being identical, the memory manager may identify the memory consumers that use those particular memory pages and map the two memory consumers to reference one of those identical memory pages and discard the other memory page. A memory consumer may be, for example, an application nor a virtual machine. Both the first memory consumer's page table and the second memory consumer's page table may store a mapping to the same memory page, which may be referred to as a deduplicated memory page. If the first memory consumer attempts to modify the deduplicated memory page, the memory manager provides the first memory consumer with a copy of the deduplicated memory page and updates the mapping in the first memory consumer's page table to reference the copy of the deduplicated memory page (rather than to the original deduplicated memory page). The first memory consumer may then be allowed to write to the copy of the deduplicated memory page.

Memory deduplication improves memory utilization by detecting that two (or more) pages in memory have identical content. Memory deduplication analyzes patterns of information by segmenting a dataset into, for example, variable length blocks and searching for recurring blocks. All identical successive blocks are replaced with a pointer to the respective initial detected block instead of storing the block again. When reading the file, the pointer series ensures that all the blocks are accessed in the exact order.

Memory deduplication may also have some disadvantages. A first memory consumer may attempt to access a memory page that is referenced by both the first memory consumer and a second memory consumer running on the same machine. If the first memory consumer attempts to write to the deduplicated memory page and it takes a while for the write to complete, the first memory consumer or user of the first memory consumer may be speculated that another memory consumer points to the same memory page, and the memory page was deduplicated and copied on the write. Based on the difference in timing for performance of the write to the memory page, the first memory consumer or user of the first memory consumer may determine that another memory consumer was using the same memory page and it was deduplicated. This is problematic because it causes information to leak from one application to another application.

In an example, the memory manager is a hypervisor, and the memory consumers are virtual machines that run on the same host machine. A user of the first virtual machine may point a browser to a particular webpage, and due to the time it takes to perform an action on the webpage, the user may guess that a second virtual machine running on the same machine has visited that particular page because the code of the webpage was in the memory of the first virtual machine. If the first virtual machine detects that the access to the webpage took a long time, the user may guess that another virtual machine has a page in its memory that the first virtual machine has visited.

It may be desirable to provide protection for memory deduplication such that memory consumers are unable to guess that a particular access to a memory page is a deduplicated memory page. In some examples, it may be desirable to handle access to memory pages identically, even if they are not deduplicated memory pages, so that access to deduplicated and non-deduplicated memory pages consume about the same amount of time. Described herein are methods and systems for providing deduplication support for one or more memory pages. In some embodiments, a method of providing deduplication support for one or more memory pages includes setting, by a memory manager, an initial memory page to a write protection mode, where the initial memory page is located in an address space allocated to a memory consumer. The method also includes detecting, by the memory manager, an attempted write to the initial memory page. The method further includes creating, by the memory manager, a copy of the initial memory page in response to detecting the attempted write. The method also includes determining whether to discard the initial memory page or the copy of the initial memory page. The method further includes discarding, based on the determination of whether to discard the initial memory page or the copy of the initial memory page, the initial memory page or the copy of the initial memory page to provide protection for memory deduplication.

Unless specifically stated otherwise, as apparent from the following discussion, it is appreciated that throughout the description, discussions utilizing terms such as "determining," "protecting," "sending," "receiving," "determining," "discarding," "detecting," "updating," "setting," "creating," "marking," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

Figure 1:
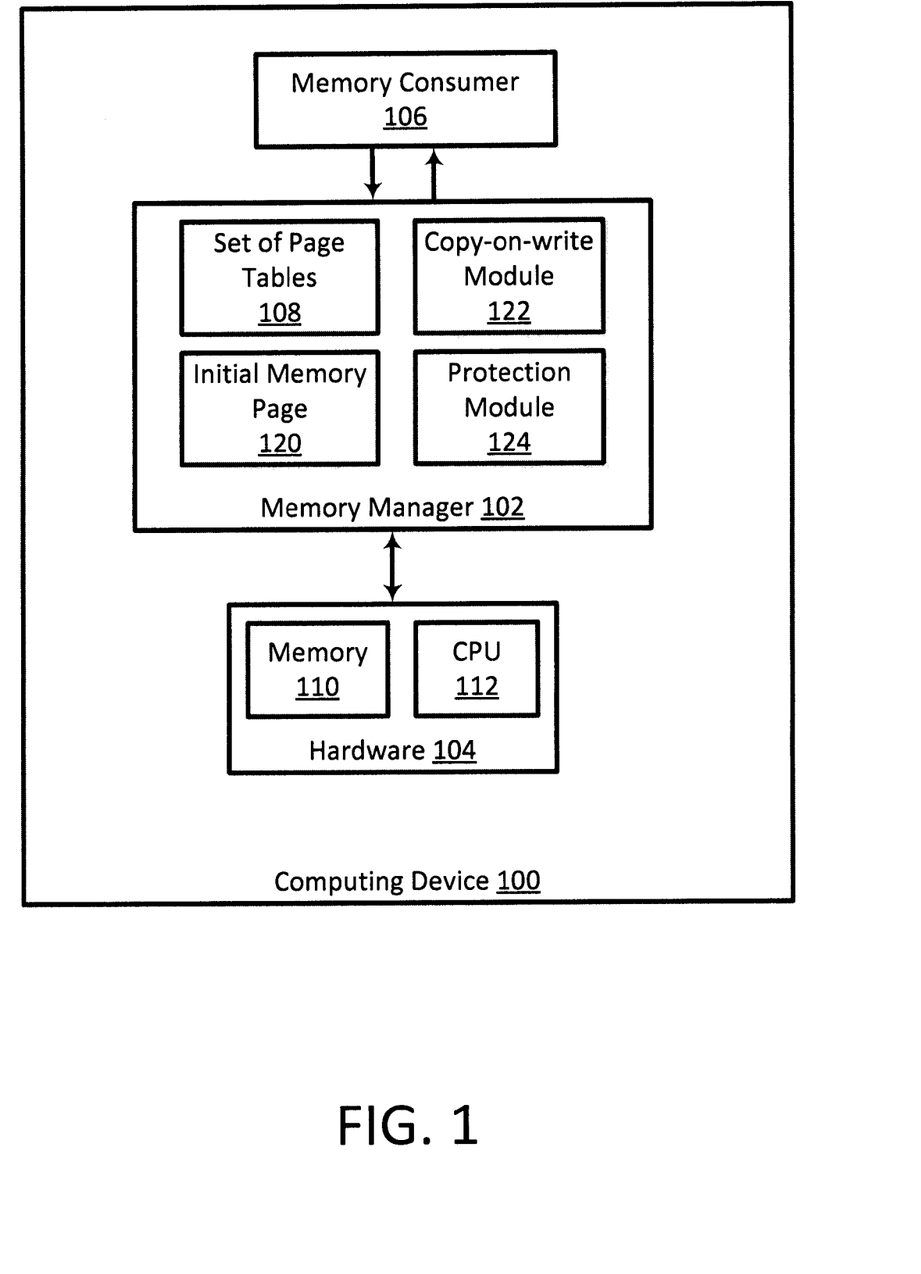
FIG. 1 depicts a computing device for providing deduplication support for one or more memory pages in accordance with one or more aspects of the present disclosure.

FIG. 1 depicts a computing device 100 for providing deduplication support for one or more memory pages in accordance with one or more aspects of the present disclosure. Computing device 100 includes a memory manager 102 coupled to hardware 104. Hardware 104 includes memory 110 and a CPU 112, and may include other input/output (I/O) devices. A memory consumer 106 may run in computing device 100 and may be allocated an address space.

"Memory" herein shall refer to volatile or non-volatile memory, such as random access memory (RAM), read-only memory (ROM), electrically erasable ROM (EEPROM), or any other memory capable of storing data. A "CPU" may also be referred to as a "physical processor" or "processor" herein. A CPU shall refer to a device capable of executing instructions encoding arithmetic, logical, or I/O operations. In one illustrative example, a CPU may follow the Von Neumann architectural model and may include an arithmetic logic unit (ALU), a control unit, and a plurality of registers. In a further aspect, a CPU may be a single core CPU that is typically capable of executing one instruction at a time (or process a single pipeline of instructions), or a multi-core CPU that may simultaneously execute multiple instructions. In another aspect, a CPU may be implemented as a single integrated circuit, two or more integrated circuits, or may be a component of a multi-chip module (e.g., in which individual microprocessor dies are included in a single integrated circuit package and hence share a single socket).

Computing device 100 may be coupled over a network (not shown). The network may be a private network (e.g., local area network (LAN), wide area network (WAN), intranet, etc.), a public network (e.g., the Internet), or a combination thereof. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and HTTP, and various combinations of the foregoing.

Memory manager 102 may allocate memory to a memory consumer 106 running on computing device 100. Memory consumer 106 may access memory 110 for reads and/or writes. Memory manager 102 maintains a set of pages tables 108 for each memory consumer 106 running on computing device 100. Set of page tables 108 may be memory consumer 106's set of page tables. Page tables are used to establish an association between the virtual address spaces of user processes and the physical memory of the system (RAM, page frames). Each stored entry of a page table is called a page table entry.

A. Application as Memory Consumer

In some examples, memory consumer 106 is an application, and memory manager 102 is an operating system that serves as an intermediary layer between hardware 104 and the software (e.g., applications running on computing device 100). In an example, the operating system is a LINUX® operating system. Trademarks are the property of their respective owners. The operating system manages resources of computing device 100 when one or more applications are running on computing device 100. In an example, the operating system may share available resources (e.g., CPU time, disk space, and network connections) between various system processes while at the same time ensuring system integrity. The operating system may use a memory management technique called virtual memory, which maps virtual addresses used by an application into physical addresses in memory. In a virtual memory system, the addresses seen by user programs do not directly correspond to the physical addresses used by the hardware. CPU 112 may include a memory management unit (MMU) (not shown) that supports the use of virtual memory. With MMU, memory addresses may go through a translation step from a virtual address to a physical address prior to each memory access. Memory 110 may include random access memory (RAM), and a MMU may divide the RAM into pages. A page is a contiguous section of memory of a set size that is handled by the MMU. In an example, each page is four kilobytes (KB).

In an example, each entry in a page table maps a location in an application's virtual memory space to a location in the physical memory space. In an example, address translation transforms addresses in the application's virtual address space to locations in physical memory (e.g., memory 110). The page table entry for a virtual page has permission bits that specify what a user space process can and cannot do with a particular page. The permission bits may specify whether a user space process may perform read, write, and/or execute (execution permission indicates that page binary data may be executed as machine code in the same way as programs are executed) operations on the page. CPU 112 may use set of page tables 108 to translate virtual memory addresses to physical memory addresses and to ensure that an entity has permission to perform a particular action on a memory page.

B. Virtual Machine as Memory Consumer

In some examples, memory manager 102 is a hypervisor, and memory consumer 106 is a virtual machine. A virtual machine is a portion of software that, when executed on appropriate hardware, creates an environment allowing the virtualization of an actual physical computer system. Each virtual machine may function as a self-contained platform, running its own operating system and software applications (processes). A host machine (e.g., computer or server) is typically enabled to simultaneously run one or more virtual machines, where each virtual machine may be used by a local or remote client. The host machine allocates a certain amount of the host's resources to each of the virtual machines. Each virtual machine may use the allocated resources to execute applications, including operating systems known as guests or guest operating systems. The hypervisor virtualizes the underlying hardware of the host machine or emulates hardware devices, making the use of the virtual machine transparent to the guest operating system or the remote client that uses the virtual machine. Typically, a hypervisor manages allocation and virtualization of computer resources and performs context switching, as may be necessary, to cycle between various virtual machines.

In a virtualization environment, the hypervisor and each guest running on a host machine has its own set of page tables. In this example, the hypervisor maintains a set of page tables 108 including one or more mappings from guest-physical memory addresses to host-physical memory addresses, which correspond to physical memory on a native platform. Host-physical memory is hardware memory (e.g., memory 110). Additionally, each guest may maintain its own set of guest page tables, which includes one or more mappings from guest-virtual memory addresses to guest-physical memory addresses, which are the guest's illusion of physical memory. This illusion is supported by the hypervisor, which maps the guest's guest-physical memory addresses to host-physical memory addresses. The translation from guest-physical memory addresses to host-physical memory address is a real-to-physical mapping that implements the virtualization of memory in a virtual machine system. The combined total size of the guest-physical memory space of all the guests running on the host machine may be bigger than the actual physical memory on the system.

Each entry in a guest page table maps a location in the guest's virtual memory space to a location in the guest's physical memory space. Address translation in the guest transforms addresses in its guest-virtual address space to locations in guest-physical memory using the set of guest page tables. To convert a guest-physical memory address to a host-physical memory address, the hypervisor maintains a real map table mapping guest-physical memory pages to host-physical memory pages, and in particular uses set of page tables 108 to translate guest-physical memory addresses to host-physical memory addresses.

Each entry in a page table of set of page tables 108 includes a mapping from a location in a virtual machine's virtual memory space to a location in the physical memory space. In an example, address translation transforms addresses in the virtual machine's virtual address space to locations in physical memory (e.g., memory 110). The page table entry for a virtual page has permission bits that specify what a user space process can and cannot do with a particular page. The permission bits may specify whether a user space process running on a virtual machine may perform read, write, and/or execute (execution permission indicates that page binary data may be executed as machine code in the same way as programs are executed) operations on the page. The hypervisor may use set of page tables 108 to translate virtual memory addresses to physical memory addresses and to ensure that an entity has permission to perform a particular action on a memory page.

III. Example Process Flow

Although one memory consumer is illustrated as running on computing device 100, it should be understood that more than one memory consumer may run on computing device 100 and each of these memory consumers may have their own set of pages tables. Memory manager 102 may maintain one or more memory pages in memory 110 in a tree structure and detect when two or more memory pages in the tree are identical. Each of these identical memory pages may be referenced in a page table entry of the memory consumer that uses the respective memory page. The memory consumer's page table entry may store a mapping to the particular memory page. Memory manager 102 may deduplicate the initial identical memory pages by updating the mappings to reference as read-only (i.e., with write protection) one of the initial identical memory pages. After updating the mappings, memory manager 102 may then free all of the initial memory pages except the referenced one.

Memory manager 102 includes a copy-on-write module 122 and a protection module 124. Copy-on-write module 122 may detect an attempted write to a memory page and create a copy of the memory page in response to detecting the attempted write. As will be explained further below, to prevent information leaks, protection module 124 may discard the memory page or the copy of the memory page to provide protection for memory deduplication.

A. Copy-on-Write for the Memory Page

Figure 2:
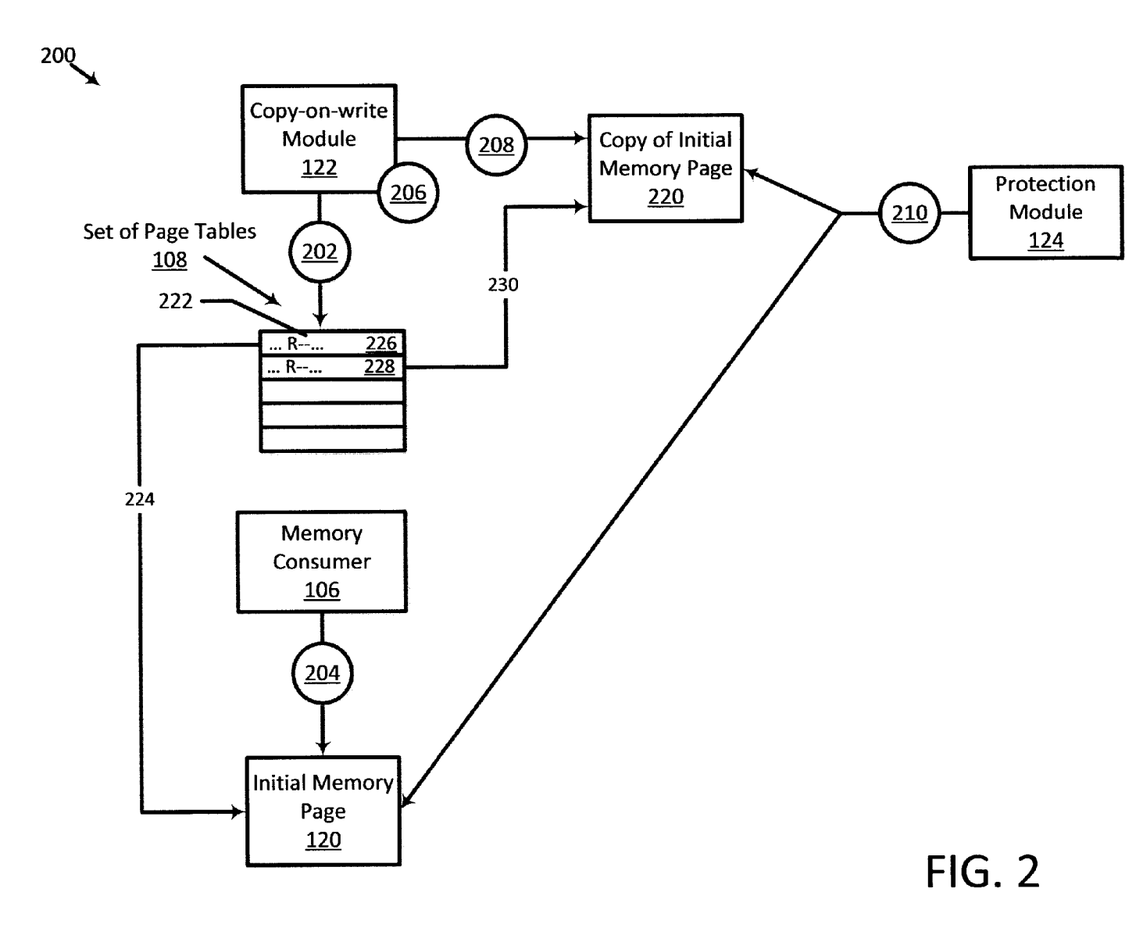
FIG. 2 illustrates a process flow for providing deduplication support for one or more memory pages in accordance with one or more aspects of the present disclosure.

FIG. 2 illustrates a process flow 200 for providing deduplication support for one or more memory pages in accordance with one or more aspects of the present disclosure. In the example illustrated in FIG. 2, set of page tables 108 stores a mapping 222 that references initial memory page 120. Set of page tables 108 is memory consumer 106's page table and references memory pages that are used by memory consumer 106. Set of page tables 108 may include page table entries, where one or more page table entries includes a mapping that references a memory page in memory consumer 106's address space. Memory consumer 160's set of page tables 108 includes a page table entry 226 including a mapping 224 that references initial memory page 120. A page table entry in set of page tables 108 may store a write protection state indicator 222 associated with a memory page (e.g., the referenced initial memory page 120). Write protection state indicator 222 indicates the permissions associated with the referenced memory page. For example, in FIG. 2, write protection state indicator 222 is "R--," which indicates that initial memory page 120 is set to a read-only mode. Accordingly, a write to initial memory page 120 may result in a page fault that is handled by memory manager 102.

Additionally, a mapping that references a memory page may be associated with a mapping permission. A mapping permission indicates the access permission to the associated virtual-to-physical memory address mapping. For example, a mapping permission of "RW" in an entry indicates that the mapping from the virtual memory address to the physical memory address can be read and modified. A mapping permission of "R-" in an entry indicates that the mapping can only be read, but not modified. A mapping permission that is set to the write protection mode is not modifiable, but may be modifiable if changed to a writable mode.

Copy-on-write module 122 may determine the mapping permissions of the applicable entries associated with initial memory page 120 in set of page tables 108. If an applicable mapping (a mapping that is associated with initial memory page 120) is not write-protected, deduplication module 138 may write protect the mapping. For example, copy-on-write module 122 may set mapping 224 that references initial memory page 120 to a write protection mode. Accordingly, no entity may be able to update mapping 224 while it is in the write protection mode.

At an action 202, copy-on-write module 122 sets initial memory page 120 to a write protection mode. Copy-on-write module 122 may set initial memory page 120 to the write protection mode by setting one or more bits in entries of set of page tables 108 associated with initial memory page 120. In an example, copy-on-write module 122 sets initial memory page 120 to the write protection mode by updating write protection state indicator 222 to a mode that results in a page fault if memory consumer 106 attempts to write to initial memory page 120. For example, "R--" is in a write protection mode for initial memory page 120. In some examples, copy-on-write module 122 marks initial memory page 120 for copy-on-write. Accordingly, if memory manager 102 detects a page fault in response to memory consumer 106 attempting to write to initial memory page 120, a copy-on-write is triggered for the memory page.

Initial memory page may be located in an address space allocated to memory consumer 106 by memory manager 102. In some examples, copy-on-write module 122 detects that initial memory page 120 has not been modified within a threshold period of time and sets initial memory page 120 to the write protection mode in response to detecting that initial memory page 120 has not been modified within the threshold period of time. It may be desirable to determine that the memory page to be set to the write protection mode has not been modified within the threshold period of time because if a memory page changes often, it may be time consuming to copy it so often, which may stall the memory consumer.

At an action 204, memory consumer 106 may attempt to write to initial memory page 120. At an action 206, copy-on-write module 122 detects an attempted write to initial memory page 120. In some examples, in response to memory consumer 106 attempting to write to initial memory page 120, a page fault is triggered. In this example, copy-on-write module 122 detects the attempted write by detecting the page fault. The attempted write may be trapped into the memory manager 102, which detects the attempted write by the trap into memory manager 102.

At an action 208, copy-on-write module 122 creates a copy of initial memory page 220 in response to detecting the attempted write to initial memory page 120. Copy of initial memory page 220 may be a memory page in memory consumer 106's address space. Copy-on-write module 122 may insert a page table entry 228 into set of page tables 108 and store a mapping 230 that references copy of initial memory page 220. Copy-on-write module 122 may set mapping 230 to a write protection mode. Accordingly, no entity may be able to update mapping 230 while it is in the write protection mode.

B. Discard One of the Identical Memory Pages

Protection module 124 determines whether to discard initial memory page 120 or copy of the initial memory page 220. At an action 210, protection module 124 discards, based on the determination of whether to discard the initial memory page 120 or copy of the initial memory page 220, initial memory page 120 or copy of the initial memory page 220 to provide protection for memory deduplication. Initial memory page 120 may be reused for some other purpose. In an example, memory manager 102 sets initial memory page 120 to a writable mode in set of page tables 108 so that the memory page may be used to store other data.

If protection module 124 discards initial memory page 120, protection module 124 sets mapping 224 in page table entry 226 to a writable mode and updates mapping 224 to reference copy of the initial memory page 220. It may be desirable to discard initial memory page 120 (the original memory page) rather than copy of the initial memory page 220 for data protection purposes because the caching behavior and/or timing may be closer to initial memory page 120. In contrast, if protection module 124 discards copy of the initial memory page 220, protection module 124 sets mapping 224 to a writable mode. Discarding copy of the initial memory page 220 includes discarding mapping 230.

Although creating a copy of initial memory page 120 and discarding one of these copies (initial memory page 120 or copy of the initial memory page 220) afterward may consume time, it may still be desirable to do so because it may prove more difficult for memory consumer 106 or a user of memory consumer 106 to determine that a memory page is a deduplicated memory page. From the perspective of memory consumer 106, it may appear that it took a while to copy initial memory page 120 so a high change exists that another memory consumer also references initial memory page 120. This, however, may be incorrect because now it may take about the same amount of time to write to a deduplicated memory page as it takes to a memory page that is not a deduplicated memory page. Accordingly, the write accesses to these memory pages take about the same amount of time and thus it would be difficult for a memory consumer 106 to determine whether a particular memory page is a deduplicated memory page. Additionally, using techniques of the present disclosure, it may be unnecessary for the write to "time-out." Rather, each write to a memory page may take about the same amount of time to accomplish.

IV. Example Method

Figure 3:
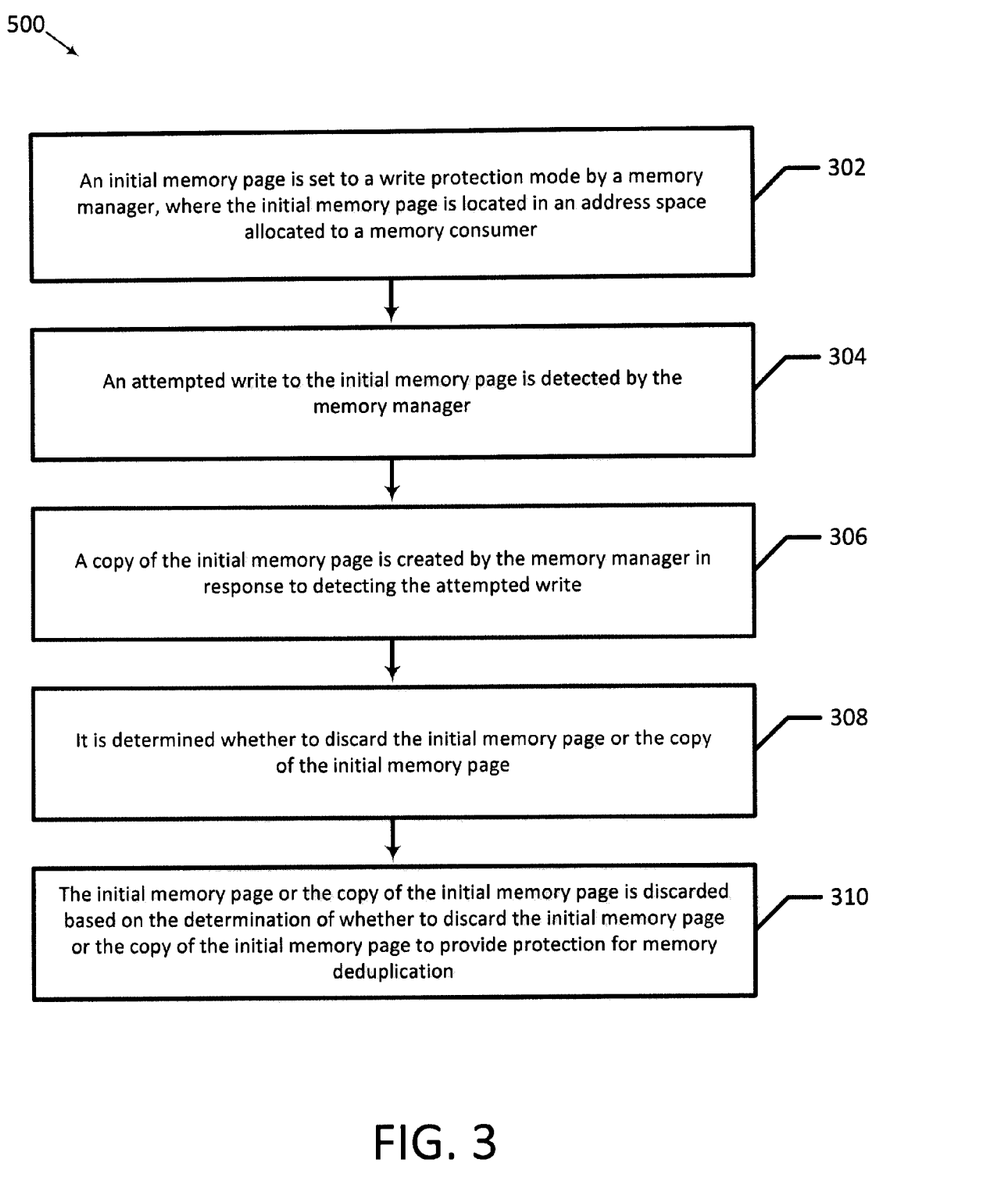
FIG. 3 is a simplified flowchart illustrating a method of providing deduplication support for one or more memory pages in accordance with one or more aspects of the present disclosure.

FIG. 3 is a simplified flowchart illustrating a method 300 of providing deduplication support for one or more memory pages in accordance with one or more aspects of the present disclosure. Method 300 is not meant to be limiting and may be used in other applications.

Method 300 includes blocks 302-310. In a block 302, an initial memory page is set to a write protection mode by a memory manager, where the initial memory page is located in an address space allocated to a memory consumer. In an example, copy-on-write module 122 sets initial memory page 120 to a write protection mode, where initial memory page 120 is located in an address space allocated to memory consumer 106. In a block 304, an attempted write to the initial memory page is detected by the memory manager. In an example, copy-on-write module 122 detects an attempted write to initial memory page 120. In a block 306, a copy of the initial memory page is created by the memory manager in response to detecting the attempted write. In an example, copy-on-write module 122 creates copy of the initial memory page 220 in response to detecting the attempted write.

In a block 308, it is determined whether to discard the initial memory page or the copy of the initial memory page. In an example, copy-on-write module 122 determines whether to discard initial memory page 120 or copy of the initial memory page 220. In a block 310, the initial memory page or the copy of the initial memory page is discarded based on the determination of whether to discard the initial memory page or the copy of the initial memory page to provide protection for memory deduplication. In an example, protection module 124 discards, based on the determination of whether to discard initial memory page 120 or copy of the initial memory page 220, initial memory page 120 or copy of the initial memory page 220 to provide protection for memory deduplication.

In some embodiments, one or more actions illustrated in blocks 302-310 may be performed for any number of memory pages corresponding to a memory consumer's address space. Some of these memory pages may be deduplicated memory pages and some may be non-deduplicated memory pages. It is also understood that additional processes may be performed before, during, or after blocks 302-310 discussed above. It is also understood that one or more of the blocks of method 300 described herein may be omitted, combined, or performed in a different sequence as desired.

As discussed above and further emphasized here, FIGS. 1-3 are merely examples, which should not unduly limit the scope of the claims.

V. Example Computing System

Figure 4:
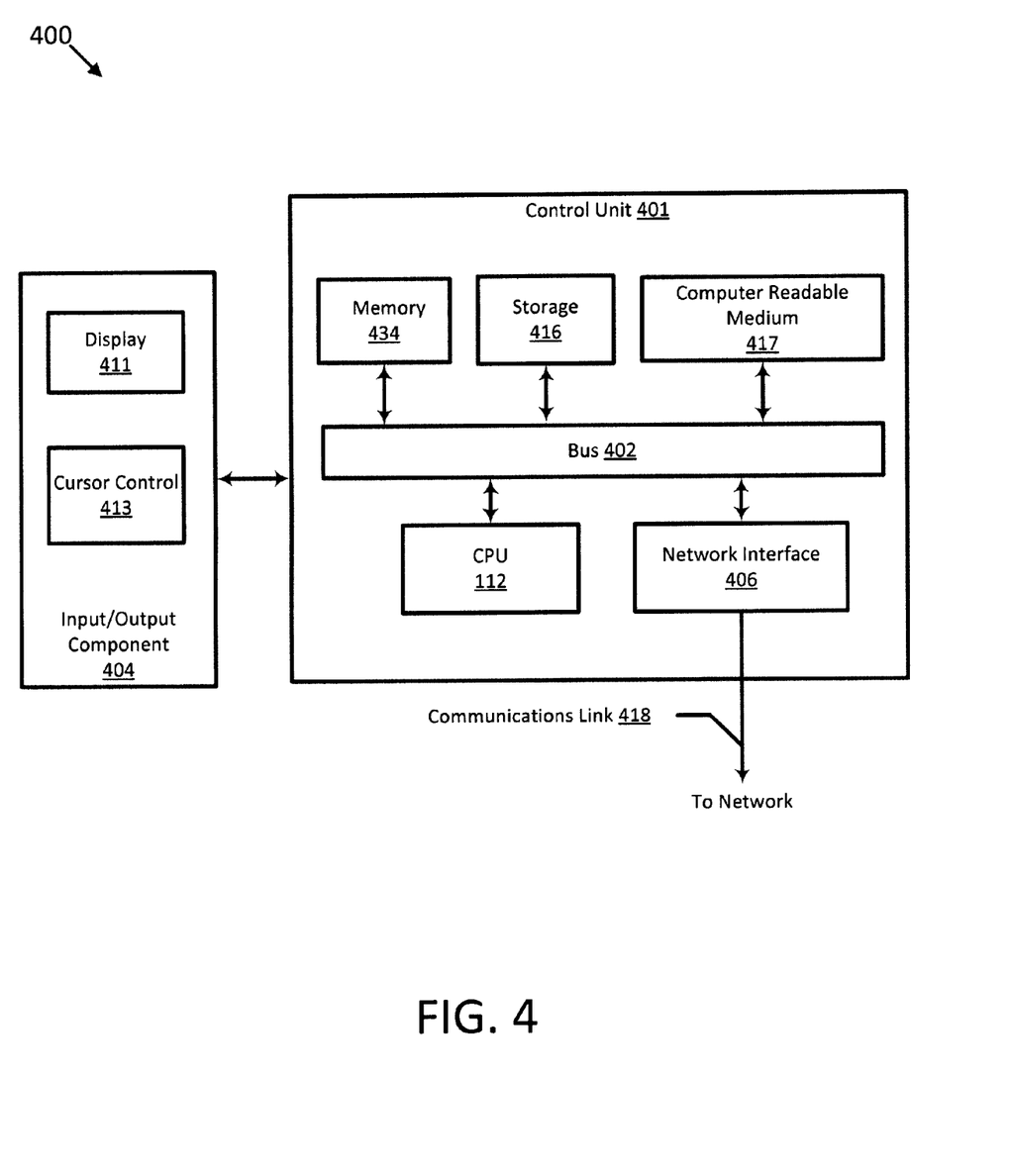
FIG. 4 is a block diagram of an electronic system suitable for implementing one or more embodiments of the present disclosure.

FIG. 4 is a block diagram of a computer system 400 suitable for implementing one or more embodiments of the present disclosure. In various implementations, computer system 400 corresponds to computing device 100, which may include a client or a server computing device. The client or server computing device may include a plurality of CPUs. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a CPU or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. In an example, a user may interact with a host computing system using I/O component 404 and cause memory consumer 106 to launch. In this example, the hypervisor may provide for de-duplication and share identical memory pages among the different processes and/or virtualized guests. I/O component 404 may also include an output component such as a display 411, and an input control such as a cursor control 413 (such as a keyboard, keypad, mouse, etc.).

A transceiver or network interface 406 transmits and receives signals between computer system 400 and other devices via a communications link 418 to a network. In an embodiment, the transmission is wireless, although other transmission mediums and methods may also be suitable. CPU 112, which may be a micro-controller, digital signal processor (DSP), or other processing component, processes these various signals, such as for display on computer system 400 or transmission to other devices via communications link 418. CPU 112 may also control transmission of information, such as cookies or IP addresses, to other devices.

Components of computer system 400 also include a system memory component 434 (e.g., RAM), a static storage component 416 (e.g., ROM), and/or a disk drive 417. System memory component 434 may include memory 110. Computer system 400 performs specific operations by CPU 112 and other components by executing one or more sequences of instructions contained in system memory component 434. Logic may be encoded in a computer readable medium, which may refer to any medium that participates in providing instructions to CPU 112 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as system memory component 434, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 300) to practice the present disclosure may be performed by computer system 400. In various other embodiments of the present disclosure, a plurality of computer systems 400 coupled by communication links 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of providing deduplication support for one or more memory pages, comprising:
    setting, by a memory manager, an initial memory page to a write protection mode, wherein the initial memory page is located in an address space allocated to a memory consumer, wherein the memory consumer's page table includes a mapping that references the initial memory page;
    setting the mapping to a writeable mode;
    detecting, by the memory manager, an attempted write to the initial memory page;
    creating, by the memory manager, a copy of the initial memory page in response to detecting the attempted write;
    determining whether to discard the initial memory page or the copy of the initial memory page; and
    discarding, based on the determination of whether to discard the initial memory page or the copy of the initial memory page, the initial memory page or the copy of the initial memory page to provide protection for memory deduplication.

2. The method of claim 1, wherein the discarding includes discarding the initial memory page, the method further including:
    updating the mapping to reference the copy of the initial memory page.

3. The method of claim 1, wherein the discarding includes discarding the copy of the initial memory page.

4. The method of claim 1, wherein the memory manager is a hypervisor that runs a virtual machine and allocates guest memory to a guest running on the virtual machine, and wherein the memory consumer is the virtual machine.

5. The method of claim 1, wherein the memory manager is an operating system executing in a machine, and the memory consumer is an application running in the machine.

6. The method of claim 1, further including:
    detecting that the initial memory page has not been modified within a threshold period of time, wherein setting the initial memory page to the write protection mode is in response to detecting that the initial memory page has not been modified within the threshold period of time.

7. The method of claim 1, further including:
    marking the initial memory page for copy-on-write.

8. The method of claim 1, wherein detecting the attempted write includes detecting a page fault.

9. A system for providing deduplication support for one or more memory pages, comprising:
    a memory that stores a plurality of memory pages, wherein a first one of the plurality of memory pages is located in an address space allocated to a memory consumer;

a memory manager that sets a mapping that references the first one of the plurality of memory pages to a writeable mode, wherein the memory consumer's page table includes the mapping;

a write protection state indicator associated with the first one of the plurality of memory pages;

a copy-on-write module that sets the write protection state indicator to a write protection mode, detects a write command associated with the first one of the plurality of memory pages, and creates a copy of the first one of the plurality of memory pages; and a protection module that discards the first one of the plurality of memory pages or the copy of the first one of the plurality of memory pages to provide protection for memory deduplication.

10. The system of claim 9, wherein the memory consumer sends a write request to the first one of the plurality of memory pages initial memory page.

11. The system of claim 9, wherein the memory manager discards the first one of the plurality of memory pages and updates the mapping to reference the copy of the first one of the plurality of memory pages.

12. The system of claim 9, wherein the memory manager discards the copy of the first one of the plurality of memory pages.

13. The system of claim 9, wherein the memory manager is a hypervisor that runs a virtual machine and allocates guest memory to a guest running on the virtual machine, and wherein the memory consumer is the virtual machine.

14. The system of claim 9, wherein the memory manager is an operating system executing in a machine, and the memory consumer is an application running in the machine.

15. The system of claim 9, wherein the hypervisor marks the first one of the plurality of memory pages for copy-on-write.

16. A non-transitory machine-readable medium comprising a plurality of machine-readable instructions that when executed by one or more processors is adapted to cause the one or more processors to perform a method comprising:

detecting that an initial memory page located in an address space allocated to a memory consumer has not been modified within a threshold period of time;

in response to detecting that the initial memory page has not been modified within the threshold period of time, setting, by a memory manager, the initial memory page to a write protection mode;

detecting, by the memory manager, an attempted write to the initial memory page;

creating, by the memory manager, a copy of the initial memory page in response to detecting the attempted write; and     discarding, by the memory manager, the initial memory page or the copy of the initial memory page.

17. The machine-readable medium of claim 16, wherein the memory consumer's page table includes an entry including a mapping that references the initial memory page, and wherein the discarding includes discarding the initial memory page, the method further including:

updating the mapping to reference the copy of the initial memory page; and     setting the mapping to a writable mode.

18. The machine-readable medium of claim 16, wherein the memory consumer's page table includes an entry including a mapping that references the initial memory page, and wherein the discarding includes discarding the copy of the initial memory page, the method further including:

setting the mapping to a writable mode.

19. The machine-readable medium of claim 16, the method further including:

marking the initial memory page for copy-on-write.

20. The machine-readable medium of claim 16, wherein detecting the attempted write includes detecting a page fault.

\* \* \* \* \*

UNITED STATES PATENT AND TRADEMARK OFFICE
CERTIFICATE OF CORRECTION

PATENT NO. : 9,836,240 B2
APPLICATION NO. : 14/869594
DATED : December 5, 2017
INVENTOR(S) : Michael Tsirkin and Andrea Arcangeli It is certified that error appears in the above-identified patent and that said Letters Patent is hereby corrected as shown below:

In the Claims

In Claim 10, Column 13, Line 18: please delete "initial memory page"

Signed and Sealed this
Twenty-fourth Day of July, 2018

Andrei Iancu
*Director of the United States Patent and Trademark Office*